United States Patent [19]
Frank et al.

[11] 3,943,565
[45] Mar. 9, 1976

[54] TRACK SCAN INITIATION AND CUTOUT ARRANGEMENT FOR A HELICAL SCAN VIDEO RECORDER

[75] Inventors: Egon Frank, Theisenort; Klaus Steiger, Kronach, both of Germany

[73] Assignee: Loewe-Opta GmbH, Kronach, Germany

[22] Filed: Sept. 25, 1974

[21] Appl. No.: 509,136

[30] Foreign Application Priority Data
Sept. 26, 1973 Germany............................ 2348286

[52] U.S. Cl. ..................... 360/70; 360/73; 360/77
[51] Int. Cl.² ................... G11B 21/04; G11B 21/10
[58] Field of Search ............. 360/70, 73, 75, 77, 14

[56] References Cited
UNITED STATES PATENTS

| | | | |
|---|---|---|---|
| 3,342,932 | 9/1967 | Bounsall............................. | 360/14 |
| 3,542,950 | 10/1970 | Luther................................ | 360/70 |
| 3,600,508 | 8/1971 | Dann.................................. | 360/14 |
| 3,663,763 | 5/1972 | Trost.................................. | 360/70 |
| 3,764,755 | 10/1973 | Yamashita......................... | 360/70 |

*Primary Examiner*—Bernard Konick
*Assistant Examiner*—Alan Faber

[57] ABSTRACT

An arrangement for initiating and terminating a scanning movement of a video tape track with respect to the scanning path of a playback head is described for use in a helical scan video recorder. A disturbance detector is actuated when the detected video pulse envelope exceeds a predetermined amplitude indicative of a minimum displacement of the track from the scanning path. Such actuated detector operates to couple the servo unit of the tape velocity regulator to a tracking controller. The controller initiates a track scanning operation by applying to the tape drive servo a cyclic modulation which is superimposed upon an error signal derived from the detected video envelope. At the conclusion of a predetermined interval normally required for the servo to adjust the track to its optimum position, the tracking controller is disconnected from the servo input, and a quiescent signal of the appropriate magnitude necessary to maintain the tape in its optimum position is applied to the servo input by a digitally instrumented storage unit that is coupled to the controller.

6 Claims, 2 Drawing Figures

TRACK SCAN INITIATION AND CUTOUT ARRANGEMENT FOR A HELICAL SCAN VIDEO RECORDER

BACKGROUND OF THE INVENTION

In conventional helical scan video recorders adapted for reproducing video signals that are modulated on a high frequency carrier and fixed on a track of an elongated magnetic tape, the tape is helically wrapped around a drum that is rotatable about its axis. A pair of circumferentially spaced magnetic pick-up heads are rotatable in a scanning path perpendicular to the axis of the drum, and serve to detect the video signals on the tape tracks as the tape is longitudinally advanced around the drum.

In order to faithfully reproduce the video signal in the playback head, it is important to assure that the video track containing the signals to be reproduced is aligned with the scanning path of the heads. Conventional techniques for assuring this essentially provide for an oscillation of each head with respect to the track. Such oscillation results in a corresponding cyclic variation in the video output from the track, which variation may then be used as an error signal for a control circuit to correct any detected misalignment of the track and head.

In copending, co-assigned application Ser. No. 346,787, filed Apr. 2, 1973, now U.S. Pat. No. 3,905,043, and entitled "Tape track-playback head alignment arrangement for a helical scan video recorder", the desired oscillation is accomplished by applying a sub-audio train of pulses to the brake of the tape advance mechanism to effect a generally triangular or sinusoidal wave modulation of the component of tape velocity parallel to the drum axis. Such cyclically varying error signal is derived from a tracking controller embodied as a pulse duration control circuit identified by the reference number 38 in the above-mentioned copending application. To accomplish this, the tracking controller is regulated by a clock pulse generator which is permanently connected in the regulating circuit so that the cyclic modulation of the error signal, and thereby a corresponding cyclic oscillation of the tape along the drum axis, is present irrespective of whether the track position is correctly located with respect to the scanning path of the playback head.

It has been found that for very high fidelity applications of the video recorder, such constant presence of the tape oscillation caused by the continuous presence of the cyclically modulated signal from the tracking controller, occasionally leads to very small but perceptible periodic disturbances of the resulting TV picture, and to a lesser extent, the accompanying sound, when the detected video program is played back.

SUMMARY OF THE INVENTION

Such disadvantage is overcome by the arrangement of the present invention, which provides a suitable improvement to the helical scan video recorder described in the above-mentioned copending application. In an illustrative embodiment, a normally disabled storage unit, preferably a reversible digital counter, is effective when enabled to continually store the last-occurring mean amplitude of the cyclic error signal produced by the tracking controller. The storage unit is normally connected to the input of the track drive servo via a first position of a change-over switch. The tracking controller is likewise connected to the input of the tape drive servo through a normally disabled second position of the switch. A disturbance detector is coupled to the detected envelope of the video signal and is rendered effective when the amplitude of the detected envelope exceeds a predetermined level for operating the first switching means from the first to the second position, thereby initiating the scanning operation of the tape.

In normal operation, the voltage value coupled to the tape servo input by the storage unit represents the value of the tracking controller signal that results in the optimally adjusted position of the video tape track with respect to the playback head scanning path. Since no cyclic modulation is superimposed on such signal from the storage unit, no "hunting" of the tape will occur while the tape is in its adjusted position and the above-mentioned audio and video periodic disturbances will not appear. On the other hand, as soon as the tape again deviates from the scanning path by an amount sufficient so that the corresponding amplitude of the detected video signal is high enough to trigger the disturbance detector, such detector will change over the switch to its second position to couple the tracking controller to the servo input to re-start the cyclical scan. At the same time, the disturbance detector will enable the counter in the storage unit, and the latter will store a count which at any instant corresponds to the then-occurring amplitude of the error signal that is produced by the tracking controller. After a time sufficient for the scanning operation to adjust the track to its correct position, the change-over switch will be restored to its first position, so that (1) the scanning operation effected by the now-disconnected tracking controller will cease, and (2) the voltage now stored in the storage unit will be automatically of the correct value to assure that the servo input to which it is now connected will maintain the correct alignment between the tape and the playback head scanning path.

BRIEF DESCRIPTION OF THE DRAWING

The invention will be further set forth in the following detailed description taken in conjunction with the appended drawing, in which.

DETAILED DESCRIPTION

Figure 1:
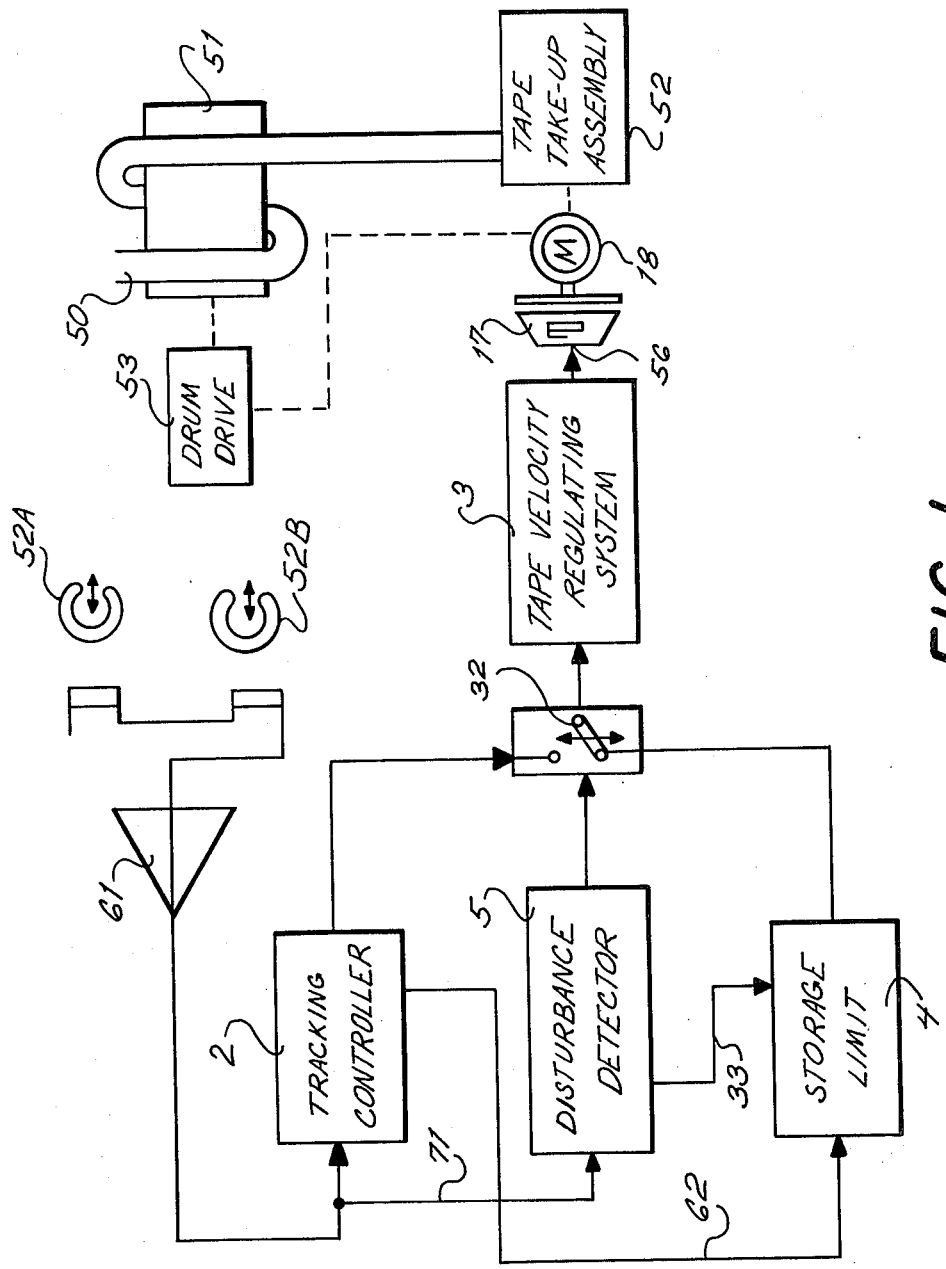
FIG. 1 is a block diagram of a tape track scan initiation and termination arrangement in accordance with the invention.

Referring now to the drawing, FIG. 1 depicts portions of a helical scan video recorder which may be of the general type described in the above-mentioned copending application Ser. No. 346,787, now U.S. Pat. No. 3,905,043. Typically, such recorder has facilities for dynamically aligning a video track of an elongated magnetic tape 50 which is helically wrapped about a drum 51, with the scanning path of a pair of schematically indicated magnetic playback heads 52a and 52b which in practise may be disposed 180° around the periphery of the drum along a prescribed mean reference path. The drum is rotatable about its axis by means of a suitable drive 53, while the tape is advanced longitudinally by a suitable take-up mechanism 54 driven by a motor 18 in timed relation to the drum rotation.

The tape 50 conventionally includes, among other carriers of information and synchronizing signals, a plurality of video tracks disposed in parallel relation at an oblique angle to the axis of the tape, each track bearing the video information in the form of a frequency modulated high frequency carrier. The pitch of the helix defined by the wound tape on the drum is selected so that the video tracks on the tape are generally perpendicular to the drum axis and therefore parallel to the scanning path traced out by the playback heads 52a and 52b as they rotate with the periphery of the drum.

An eddy current brake 17 cooperates with the motor 18 to provide a variable drag on the tape advance. Such drag may be varied by a modulating voltage applied to an input 56 of the brake, and will correspondingly vary the advanced velocity of the tape relative to the rotational speed of the associated playback heads.

The rate of advance of the tape 50 is subjected to a modulation in a prescribed mechanical pattern by applying to the brake 17 a suitable control voltage from a tape velocity regulating system 3. Such modulation causes a corresponding displacement of each video track along a path parallel to the drum axis with respect to the position of the rotating head. This displacement, in turn, causes a corresponding variation of the amplitude envelope of the video signal detected by the playback heads 52a and 52b.

The output of the head 52a or 52b is applied via a pre-amplifier 61 to a tracking controller 2 which may be similar to the pulse duration control circuit represented by the numeral 38 in the above-mentioned copending application. The controller 2 serves to initiate a scanning operation of the tape 50 by applying an error signal derived from the detected envelope of the video signal to the input of the tape velocity regulation system 3 through a schematically indicated electronic change-over switch 32 when the latter is operated from a normal lower position to an upper position. As explained in the copending application, the controller 2 operates to superimpose on the error signal derived from the detected modulated video signal, a cyclic modulation which causes the regulation system 3 to impart a corresponding oscillatory movement to the tape 50 along the axis of the drum 51.

In accordance with the invention, the hunting effect on the tape 50 caused by driving the input of the regulation system 3 with the cyclically modulated error signal from the controller 2 is eliminated whenever the tape is adjusted to its optimum position along the drum axis. In particular, the arrangement of FIG. 1 further includes a storage unit 4 which operates during the occurrence of each scanning mode (i.e. the mode occurring when the input of the regulation system 3 is coupled to the controller 2) by receiving the means amplitude of the error voltage developed by the controller 2 via a conductor 62. Thus, whenever the controller 2 has been effective to position the tape 50 in alignment with the scanning path of the heads 52a and 52b, the value of the error signal then present at the output of the controller 2 is equal to the value then stored in the storage unit 4.

The output of the storage unit 4 is coupled via the lower position illustrated of the switch 32 to the input of the regulation system 3. As a consequence, once the tape is adjusted to be in alignment with the playback head scanning path, then, if no disturbance subsequently arises the steady voltage value at the output of the storage unit 4 will be effective to maintain the tape in the optimum position. At the same time, the absence of a cyclic modulation signal at the output of the storage unit 4 assures that, at the optimum tape position, no undesirable periodic disturbances will occur in the sound or picture portions of the ultimately reproduced video signal.

If, however, a disturbance of significant amplitude does occur that effects the alignment between the track and the playback heads, the change-over switch 32 will be operated from its lower position to its upper position to again couple the output of the controller 2 to the input of the regulation system 3. This will again initiate a scanning operation to correspondingly vary the amplitude of the detected video envelope in closed-loop fashion to again reposition the tape to its ideal position. In accordance with the invention, a disturbance detector 5 is provided for operating the change-over switch 32 from its normal position that couples the storage unit 4 to the system 3 to a position that couples the controller 2 to the system 3 whenever the position of the track deviates from its optimum position on the drum by a predetermined amount. This is accomplished by coupling the input of the detector 5 to the output of the preamplifier 61 via a conductor 71 so that such detector is responsive to values of the detected envelope of the video signal exceeding a predetermined value indicative of such minimum track displacement. In order to assure that the storage unit 4 follows the error voltage developed by the controller 2 during the time that such controller is coupled to the system 3, a conductor 33 extends from the detector to the storage unit 4 to enable a digital counter in such unit 4 whenever the switch 32 is in its upper position indicated.

Figure 2:
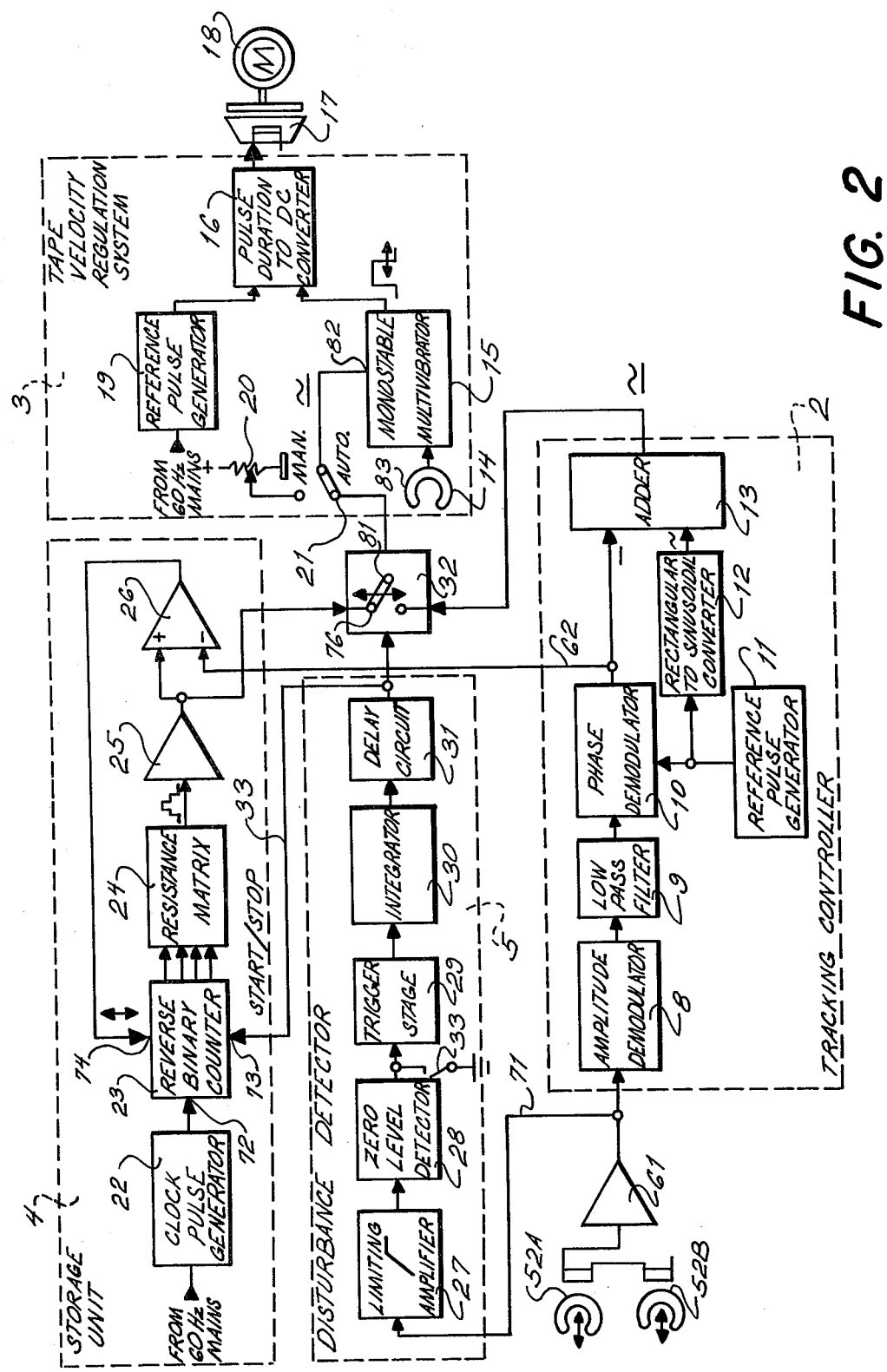
FIG. 2 is a more detailed combination block and schematic diagram of the arrangement of FIG. 1.

The elements indicated in FIG. 1 are shown in somewhat more detail in FIG. 2. For example, the storage unit 4 illustratively includes a reversible binary counter 23 having a counting input 72, a conditioning input 73 and a reversing input 74. The counting input 72 is coupled to the output of a clock pulse generator 22, which in practise may be a pulse shaping circuit that transforms a sinusoidal 60 hz. voltage from the power mains to a rectangular pulse of corresponding frequency. Such rectangular pulses serve to step the counter 23 in either a forward or a reverse direction depending on the polarity of a voltage applied to the reversing input 74 whenever the conditioning input 73 is excited by a "start" signal applied thereto from the disturbance detector 5 via the conductor 33. The output of the counter 23, which may be a four-bit binary signal as shown, is decoded in a resistance matrix 24 to provide the illustrated staircase signal. The value of the staircase voltage that exists whenever the switch 32 is changed over from its lower to its upper position illustrated in FIG. 2 will correspond to the optimum track position of the magnetic tape relative to the scanning path of the heads 52a and 52b; since such optimum value will represent the non-cyclic portion of the error signal developed by the tracking controller 2 at the conclusion of its scanning operation, such non-cyclic portion is coupled via conductor 62 from the controller 2 to the remaining input of the difference amplifier 26. Whenever the switch 32 is changed over to effect the control of the input of the system 3 from the storage unit 4, a "stop" signal is applied to the conditioning input 73 of the counter 23 so that the latter is prevented from further altering the quantized voltage level of the staircase signal at the output of the resistance matrix 24. The tracking controller 2 illustratively includes an input amplitude demodulator 8 coupled to the detected envelope of the modulated video wave form via the pre-amplifier 61. The output of the demodulator 8 is coupled via a low pass filter 9 to one input of a phase demodulator 10. The other input of the phase demodulator is excited by a reference pulse generator 11, whose repetition rate illustratively is made lower than the lowest audio frequency component recorded on a suitable auxiliary track of the tape to be reproduced. The output of the phase demodulator 10 is coupled to the conductor 62 for application to the difference amplifier 26 of the storage unit 4.

The output of the phase demodulator 10 is also coupled to one input of an adder 13. The other input of the adder 13 is excited by the reference pulse generator 11 via a rectangular to sinusoidal converter 12. The output of the adder 13 constitutes a cyclically modulated error signal indicative of the instantaneous deviation of the position of the track relative to the scanning path of the playback heads, and serves to control the input of the tape velocity regulating system 3 whenever the change-over switch 32 is switched into its lower position by the disturbance detector 5.

The disturbance detector includes an input limiting amplifier coupled to the output of the pre-amplifier 61. The output of the limiting amplifier is coupled to a zero level detector 28. A threshold-operated trigger stage 29 responds to a finite output from the detector 28 to yield a pulse that is integrated in a suitable circuit 30. The output of the integrator 30 serves as a switching signal for the change-over switch 32, by which such switch is changed over from its normal position (i.e. the upper position shown in FIG. 2). to its lower position. In order to prevent the change-over switch 32 from being restored to its normal position before the scanning operation initiated by the tracking controller has had an opportunity to effect the positioning of the tape to its optimum position, a reconnection delay circuit 31 is interposed between the output of the integrator 30 and the switching input of the switch 32.

The output of the change-over switch 32 represented by a movable contact 81 thereof, is coupled to a duration control input 82 of a mono-stable multivibrator 15 within the tape velocity regulation system 3. The voltage applied to such input 82 serves to adjust the duration of the output pulse generated by the multivibrator 15 in response to a succession of sync pulses recorded on a suitable synchronizing track of the tape 50 (FIG. 1) and picked up by an auxiliary magnetic head 83 of the recording apparatus. Thus, each of the resulting trains of pulses at the output of the multivibrator 15 has a duration whose deviation, in amplitude and sense, from a standard pulse duration is at any time representative of the magnitude and direction, respectively, of the mean locus of the modulated video track excursion with respect to the scanning path of the heads 52a and 52b.

A D.C. error signal representative at any instant of the magnitude and sense of such pulse width deviation is obtained by suitably comparing the output of the multivibrator 15 with the output of a reference generator 19 of standard width pulses in a conventional pulse duration-to-voltage converter 16. Illustratively, the reference generator 19 may be a conventional frequency divider coupled to the 60 cycle output of the A.C. mains, and may include pulse shaping facilities so that a 30 cycle rectangular wave form of standard pulse width is applied to the converter 16. The output of the converter 16 serves as the excitation signal for the eddy current brake 17.

In the arrangement depicted, the disturbance detector 5 normally operates to provide switching signals to the switch 32 only when a new scanning operation is to be initiated, i.e. only when the detected envelope of the modulated video output exceeds a predetermined level. However, in order to check out the operation of the scanning system even when the tape track is in its optimum position (so that the detector 5 would ordinarily not be actuated), an auxiliary keying switch 33 is coupled to ground from the input of the trigger stage 29 of the detector 5. Therefore, manual operation of the keying switch 33 will override the normal input conditions of the detector 5 and will permit switching of the change-over switch 32 to a position effective to couple the output of the tracking controller 2 to the input of the regulating system 3.

Additionally, an optional manual control of the pulse duration control voltage at the input 82 of the multivibrator 15 may be obtained by incorporating an additional switch 21 into the regulating system 3. The switch 21 is arranged to selectively couple, to the duration adjustment input 82, either the output of the switch 32 or the output of a manually adjustable potentiometer 20.

In the foregoing, the invention has been described in connection with a preferred arrangement thereof. Many variations and modifications will now occur to those skilled in the art. It is accordingly desired that the scope of the appended claims not be limited to the specific disclosure herein contained.

What is claimed is:

1. In a helical scan video recorder adapted for reproducing video signals modulated on a high frequency carrier and fixed on a track of an elongated magnetic tape, the tape being adapted to be helically wrapped around a drum that is rotatable about its axis, the recorder including a magnetic pick-up head rotatable in a scanning path with the periphery of the drum for detecting video signals modulated on the tape as the tape is longitudinally advanced, means for longitudinally advancing the tape, means responsive to the detected envelope of the video signal for generating an error signal whose mean amplitude is proportional to the instantaneous amplitude of deviation of the video track from the scanning path of the magnetic head, and tape velocity regulation means connectible to the output of the error signal generating means and cooperable with the tape advancing means for varying the advance of the tape in accordance with variations of the error signal to correspondingly vary the amplitude envelope of the video signal detected by the head, the improvement which comprises, in combination, storage means coupled to the error signal generating means for continually storing the last-occurring mean amplitude of the error signal, first switching means effective when in a normal first position to couple the output of the storage means to the input of the tape velocity regulation means, said first switching means being operable from the first position to a second position to couple the output of the error signal generating means to the input of the tape velocity regulation means, and means responsive to the detected envelope of the video signal and rendered effective when the amplitude of such detected envelope exceeds a predetermined level for operating the first switching means from the first position to the second position.

2. The improvement as defined in claim 1, in which the storage means comprises, in combination, a clock pulse generator, a normally disabled binary counter having a counting input coupled to the clock pulse generator, a conditioning input operable to enable the counter, and a reversing input actuable to program the direction of counting, a resistance matrix coupled to the output of the counter, and a difference amplifier having a first input coupled to the output of the resistance matrix and an output coupled to the reversing input of the binary counter.

3. The improvement as defined in claim 1, wherein the operating means for the first switching means comprises, in combination, a limiting amplifier coupled to the detected video signal envelope, a zero level detector coupled to the output of the limiting amplifier, a threshold-operated trigger circuit coupled to the output of the zero level detector, and means for integrating the output of the zero level detector.

4. The improvement as defined in claim 1, further comprising, in combination, a manually variable voltage source, second switching means selectively operable between first and second positions, and means for individually coupling the output of the first switching means and of the variable voltage source to the input of the tape velocity regulation means through the first and second positions, respectively, of the second switching means.

5. The improvement as defined in claim 1, in which the operating means further comprises means coupled to the output of the integrating means for delaying the restoration of the first switching means to its first position for a predetermined interval.

6. The improvement as defined in claim 3, in which the output of the error signal generating means is applied to a second input of the difference amplifier.

* * * * *